United States Patent [19]
Kumagai

[11] Patent Number: 5,963,587
[45] Date of Patent: *Oct. 5, 1999

[54] WIDEBAND TRANSCEIVER

[75] Inventor: Yoshiaki Kumagai, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/656,080

[22] Filed: May 31, 1996

[30] Foreign Application Priority Data

Nov. 30, 1995 [JP] Japan ................................ 7-312736

[51] Int. Cl.⁶ ........................................ H04B 1/38
[52] U.S. Cl. ............................. 375/219; 455/78; 455/83
[58] Field of Search ........................... 375/219; 370/276, 370/277, 278, 282; 455/73, 78, 83

[56] References Cited

U.S. PATENT DOCUMENTS

| | | | |
|---|---|---|---|
| 4,212,013 | 7/1980 | Biethan et al. ......................... | 375/219 |
| 4,223,310 | 9/1980 | Davidson et al. ...................... | 370/276 |
| 4,361,904 | 11/1982 | Matsumura .............................. | 375/219 |
| 4,489,413 | 12/1984 | Richmond et al. ...................... | 455/86 |
| 4,761,821 | 8/1988 | Mawhinney et al. ..................... | 455/73 |
| 5,212,813 | 5/1993 | Renaud ................................... | 455/83 |

FOREIGN PATENT DOCUMENTS

| | | |
|---|---|---|
| 0 262 391 A2 | 4/1988 | European Pat. Off. . |
| 0 481 825 A2 | 4/1992 | European Pat. Off. . |

*Primary Examiner*—Temesghen Ghebretinsae
*Attorney, Agent, or Firm*—Helfgott & Karas, P.C.

[57] ABSTRACT

A wideband transceiver has high- and low-band-pass filters for dividing a communication band into high and low bands to form transmission and reception channels. The transceiver also has circulators and a switching unit. The switching unit determines transmission and reception paths by combining the signal propagating directions of the circulators and the out-of-band signal reflecting directions of the band-pass filters according to specified transmission and reception frequencies.

12 Claims, 11 Drawing Sheets

Fig. 11

| SETTING | | BAND | SIGNAL PATH |
|---|---|---|---|
| 1 | TRANS-MISSION | BPF11 | (13)→(12)→(82)→(11)PASS→(81)→(31)→(91)→(61)REFLECT→(91)→(21)REFLECT→(91)→(31)→OUTPUT |
| | RECEP-TION | BPF21 | INPUT→(31)→(81)→(51)REFLECT→(81)→(11)REFLECT→(81)→(31)→(91)→(61)REFLECT→(91)→(21)PASS→(92)→(22)→(23) |
| 2 | TRANS-MISSION | BPF51 | (13)→(12)→(82)→(11)REFLECT→(82)→(51)PASS→(81)→(11)REFLECT→(81)→(31)→(91)→(61)REFLECT→(91)→(31)→OUTPUT |
| | RECEP-TION | BPF61 | INPUT→(31)→(81)→(51)REFLECT→(81)→(11)REFLECT→(81)→(31)→(91)→(61)PASS→(92)→(22)→(23) |
| 3 | TRANS-MISSION | BPF21 | (13)→(12)→(82)→(11)REFLECT→(82)→(51)REFLECT→(82)→(12)→(22)→(92)→(21)PASS→(91)→(31)→OUTPUT |
| | RECEP-TION | BPF11 | INPUT→(31)→(81)→(11)PASS→(82)→(51)REFLECT→(82)→(12)→(22)→(92)→(21)REFLECT→(92)→(22)→(23) |
| 4 | TRANS-MISSION | BPF61 | (13)→(12)→(82)→(51)REFLECT→(82)→(12)→(22)→(92)→(21)REFLECT→(92)→(91)→(31)→OUTPUT |
| | RECEP-TION | BPF51 | INPUT→(31)→(81)→(51)PASS→(82)→(12)→(22)→(92)→(21)REFLECT→(92)→(22)→(23) |

Fig.12

| | CONTROL OBJECT | BAND ALLOCATION 1 (LOW BAND FOR TRANSMISSION) | BAND ALLOCATION 2 (HIGH BAND FOR TRANSMISSION) |
|---|---|---|---|
| OPERATION OF FREQUENCY CONTROLLER 36 | LOCAL TRANSMISSION FREQUENCY | LOW | HIGH |
| | LOCAL RECEPTION FREQUENCY | HIGH | LOW |
| OPERATION OF ALARM UNIT 35 | DETECTOR SELECTION | DETECTOR 34 | DETECTOR 32 |

WIDEBAND TRANSCEIVER

BACKGROUND OF THE INVENTION

1. Field of the Invention

The present invention relates to a wireless transceiver used for an entrance circuit between base stations or a private communication network installed between buildings. In particular, the present invention relates to a wideband transceiver that employs band-pass filters for dividing a communication band into transmission and reception bands, switches transmission and reception operations from one to another, and carries out communication through channels formed in the transmission and reception bands.

2. Description of the Related Art

A wideband transceiver is usually incorporated in a compact casing of, for example, 30-cm cube that is installed outside. The transceiver is required to be more compact and lower in cost because a wireless communication system needs many transceivers.

The wideband transceiver has high- and low-band-pass filters that divide a band into two, one for transmission and the other for reception. Each of the transmission and reception bands forms a plurality of channels at regular intervals.

The band-pass filters are switched from one to another with many mechanical switches in response to an instruction. These switches are bottlenecks in minimizing the size and weight of the transceiver and lowering the cost thereof. It is difficult for the mechanical switches to realize a complicated and precise setting of the filters because of the number of switches involved.

SUMMARY OF THE INVENTION

An object of the present invention is to provide a compact, light, low-cost wideband transceiver capable of transmitting and receiving signals without mechanical switches.

Another object of the present invention is to provide a wideband transceiver capable of detecting an abnormality in transmission and reception signals.

In order to accomplish the objects, the present invention provides a wideband transceiver having high- and low-band-pass filters, for dividing a communication band into high and low bands to form transmission and reception channels, circulators, and a switching unit. The switching unit determines transmission and reception paths by combining the signal propagating directions of the circulators and the out-of-band signal reflecting directions of the band-pass filters according to specified transmission and reception frequencies.

The circulators consist of first to third circulators. The first circulator has a first terminal for receiving a transmission signal, a second terminal connected to a first terminal of the low-band-pass filter, and a third terminal connected to a second terminal of the second circulator. The second circulator has a first terminal for providing a reception signal, the second terminal, and a third terminal connected to a first terminal of the high-band-pass filter. The third circulator has a first terminal connected to a second terminal of the high-band-pass filter, a second terminal connected to an input/output unit for transmitting and receiving transmission and reception signals, and a third terminal connected to a second terminal of the low-band-pass filter. The circulating direction of each of the circulators is from the first terminal to the second terminal, from the second terminal to the third terminal, and from the third terminal to the first terminal.

The third circulator may be replaced with a fourth circulator having a first terminal connected to the second terminal of the low-band-pass filter, a second terminal connected to the input/output unit, and a third terminal connected to the second terminal of the high-band-pass filter.

The transceiver further has a first directional coupler disposed between the second terminal of the low-band-pass filter and the third circulator and oriented toward the third circulator, a first detector for detecting the level of an output signal from the first directional coupler, a second directional coupler disposed between the first circulator and the second circulator and oriented toward the second circulator, a second detector for detecting the level of an output signal from the second directional coupler, and an alarm unit for finding an abnormality, if any, in signals passing through the first and second directional couplers according to the outputs of the first and second detectors. The alarm unit selects one of the outputs of the first and second detectors according to specified transmission and reception frequencies and finds an abnormality in the selected output.

The high-band-pass filter may consist of n high-band-pass filters, and the low-band-pass filter may consist of n low-band-pass filters. In this case, a fourth circulator having n+1 terminals and the same circulating direction as the first circulator is arranged between and connected to the first circulator and the n low-band-pass filters. A fifth circulator having n+1 terminals and the same circulating direction as the first circulator is arranged between and connected to the n low-band-pass filters and the third circulator. A sixth circulator having n+1 terminals and the same circulating direction as the second circulator is arranged between and connected to the second circulator and the n high-band-pass filters. A seventh circulator having n+1 terminals and the same circulating direction as the second circulator is arranged between and connected to the n high-band-pass filters and the third circulator.

BRIEF DESCRIPTION OF THE DRAWINGS

The present invention will be more clearly understood from the description as set forth below with reference to the accompanying drawings, in which:

FIG. 11 is a table showing signal paths realized by the embodiment of FIG. 9;

FIG. 12 is a table showing the operations of detectors for detecting an out-of-band abnormality according to the present invention.

DESCRIPTION OF THE PREFERRED EMBODIMENTS

For a better understanding of the preferred embodiments of the present invention, the problem in the prior art will be explained.

Figure 1:
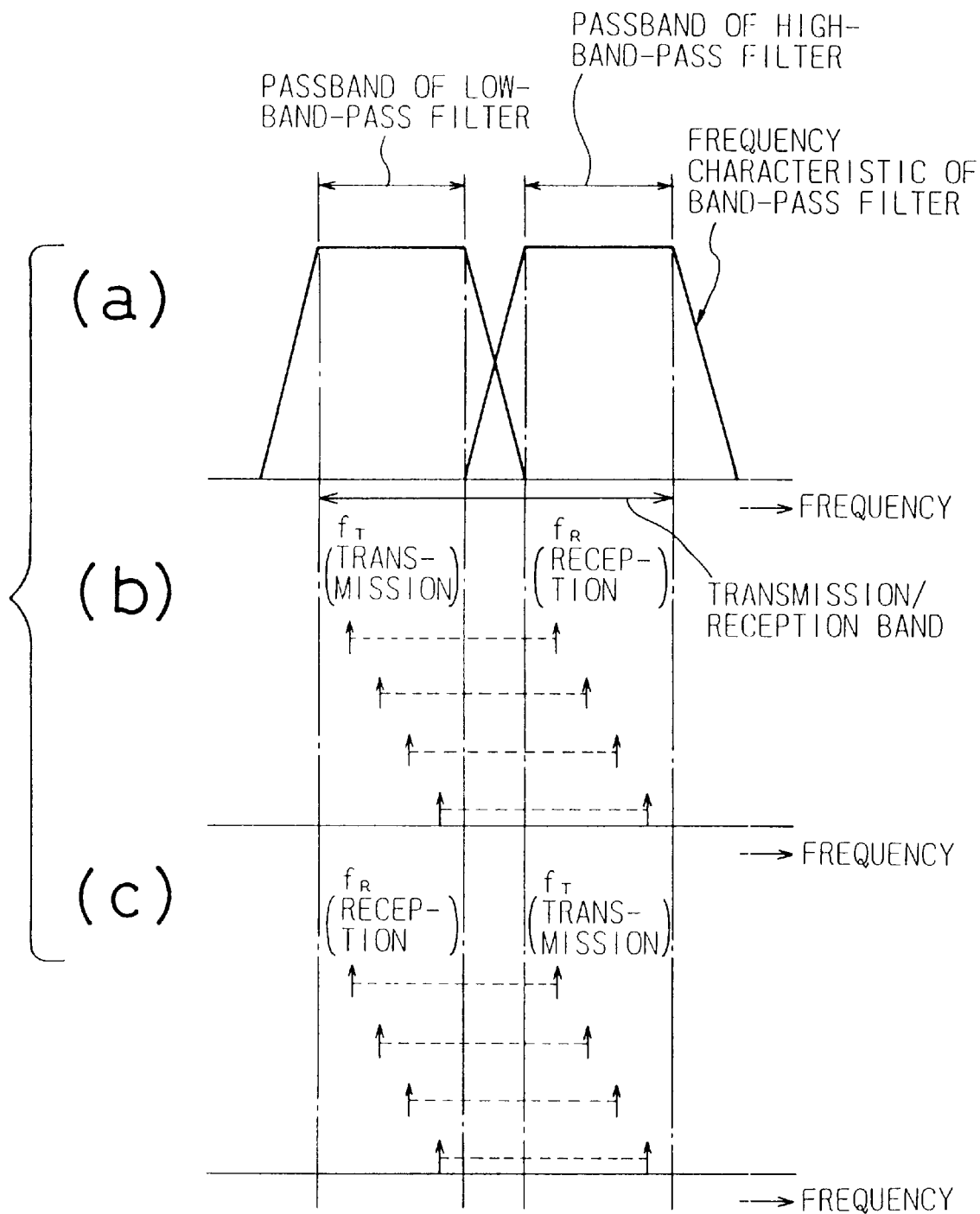
FIG. 1 explains transmission and reception bands of a wideband transceiver.

FIG. 1 explains transmission and reception bands of a wideband transceiver.

The top (a) of the figure shows a frequency band that is halved by high- and low-band-pass filters into low and high bands used for transmission and reception. The middle (b) of the figure shows that the low band is used for transmission and the high band for reception. The bottom (c) of the figure shows that the low band is used for reception and the high band for transmission. The low and high bands include each a plurality of communication channels where transmission frequencies fT and reception frequencies fR are set at regular intervals.

Figure 2:
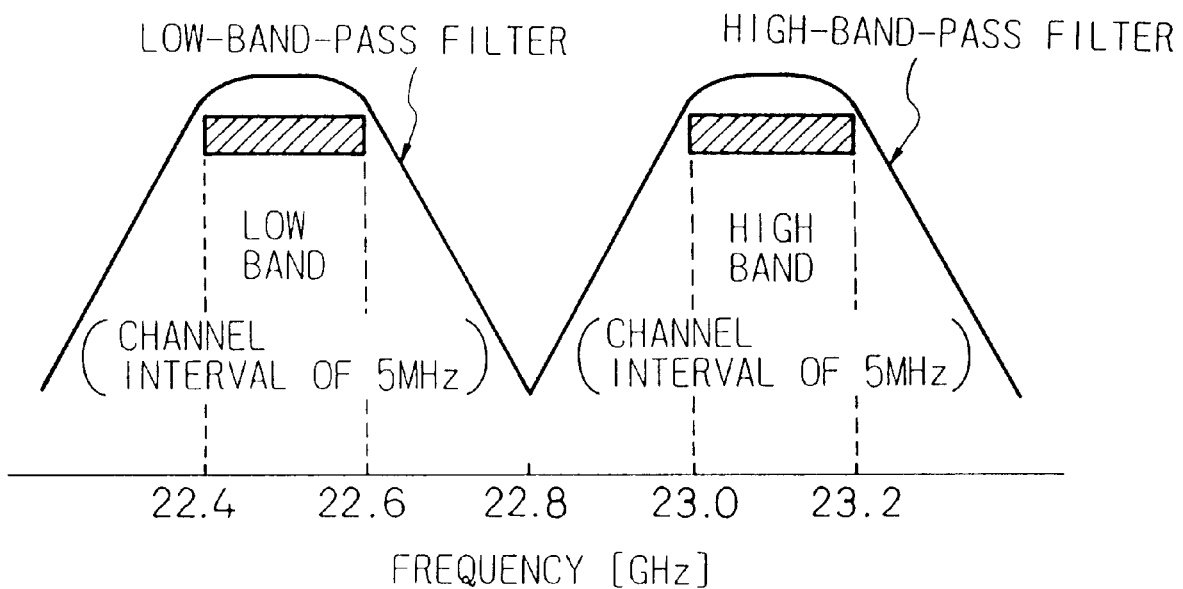
FIG. 2 shows examples of bands of a 22-GHz-band entrance circuit.

FIG. 2 shows a low band of 0.2 GHz ranging from 22.4 GHz to 22.6 GHz passing through a low-band-pass filter, and a high band of 0.2 GHz ranging from 23.0 GHz to 23.2 GHz passing through a high-band-pass filter. In each of the low and high bands, channels are formed at intervals of 5 MHz.

Figure 3:
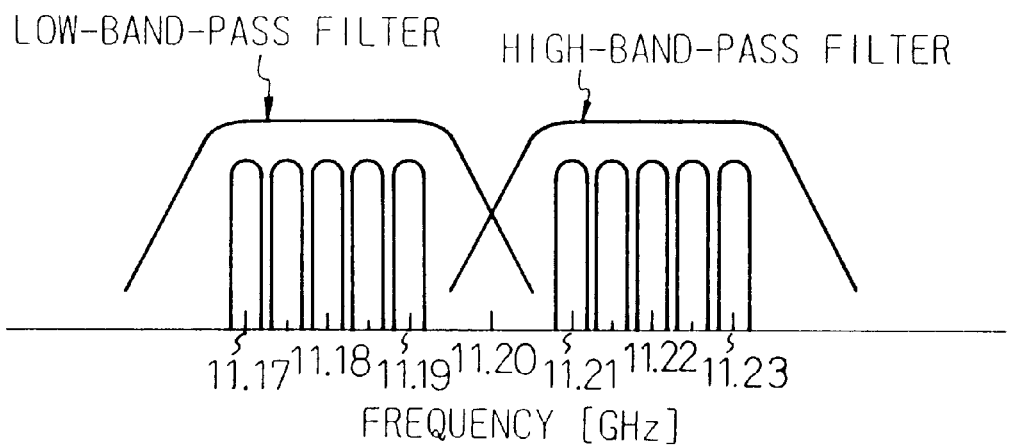
FIG. 3 shows examples of channels of an 11-GHz-band transmission circuit between base stations.

FIG. 3 shows channels in an 11-GHz transmission circuit between base stations. Each of transmission and reception bands has channels at intervals of 5 MHz (0.005 GHz). Corresponding transmission and reception channels are spaced by 40 MHz (0.04 GHz).

Figure 4:
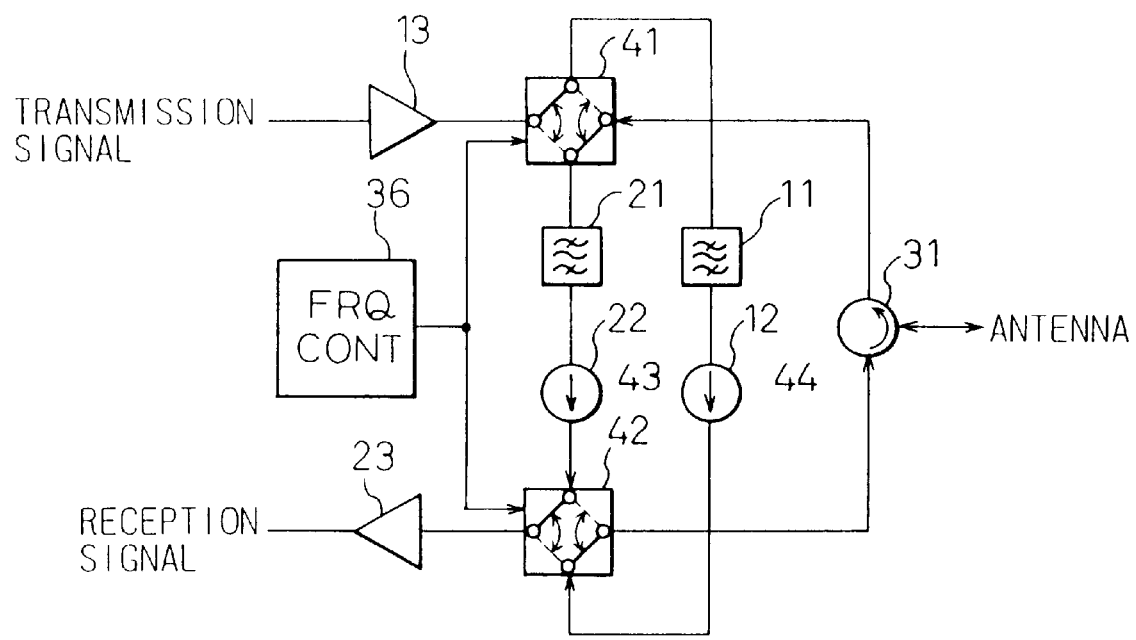
FIG. 4 is a block diagram showing switches and band-pass filters of a wideband transceiver according to a prior art.

FIG. 4 shows switches and band-pass filters of a wideband transceiver according to a prior art.

The transceiver has a low-band-pass filter 11 and a high-band-pass filter 21. A frequency controller 36 controls switches 41 and 42 in response to a specified local frequency for transmission or reception, to switch the filters 11 and 21 from one to another. The switches 41 and 42 are transfer-type mechanical switches each capable of setting two exclusive paths as indicated with continuous and dotted lines.

When the frequency controller 36 selects the paths indicated with the continuous lines, a transmission signal amplified by a high-power amplifier 13 passes through the switch 41, the low-band-pass filter 11, an isolator 44, the switch 42, and a circulator 31. The circulator 31 transfers the signal to an antenna (not shown). A signal received by the antenna passes through the circulator 31, the switch 41, the high-band-pass filter 21, an isolator 43, the switch 42, and a low-noise amplifier 23.

When the frequency controller 36 selects the paths indicated with the dotted lines, a transmission signal amplified by the high-power amplifier 13 passes through the switch 41, high-band-pass filter 21, isolator 43, switch 42, and circulator 31. The circulator 31 transfers the signal to the antenna. A signal received by the antenna passes through the circulator 31, switch 41, low-band-pass filter 11, isolator 44, switch 42, and low-noise amplifier 23.

In this way, controlling the switches 41 and 42 selects paths to pass the low- and high-band-pass filters 11 and 21, to thereby set a proper transmission/reception frequency.

Figure 5:
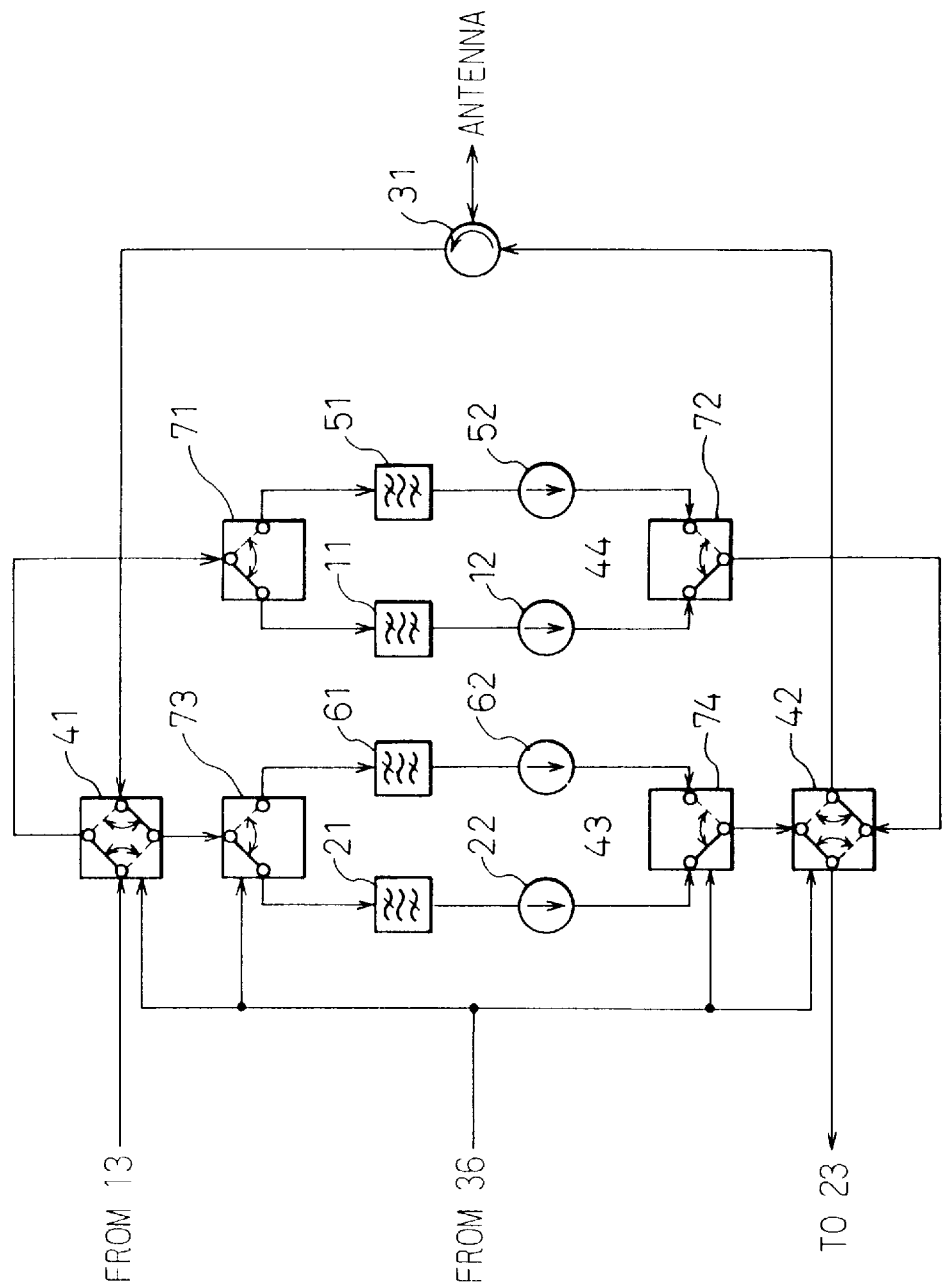
FIG. 5 is a block diagram showing switches and band-pass filters of a wideband transceiver according to a prior art.

FIG. 5 shows switches and band-pass filters of a wideband transceiver according to another prior art.

This transceiver is capable of precisely setting a passband. The transceiver has low-band-pass filters 11 and 51 having different filtering characteristics, isolators 12 and 52 connected to the filters 11 and 51, respectively, high-band-pass filters 21 and 61 having different filtering characteristics, and isolators 22 and 62 connected to the filters 21 and 61, respectively. Switches 71 and 72 select one of the filters 11 and 51, and switches 73 and 74 select one of the filters 21 and 61.

The switches 71 to 74 are SPDT switches. Paths are formed through the low-band-pass filters 11 and 51 and high-band-pass filters 21 and 61 similar to the prior art of FIG. 4, and a frequency controller 36 controls the switches 71 to 74 to select each one of the high- and low-band-pass filters.

Next, preferred embodiments of the present invention will be explained.

Figure 6:
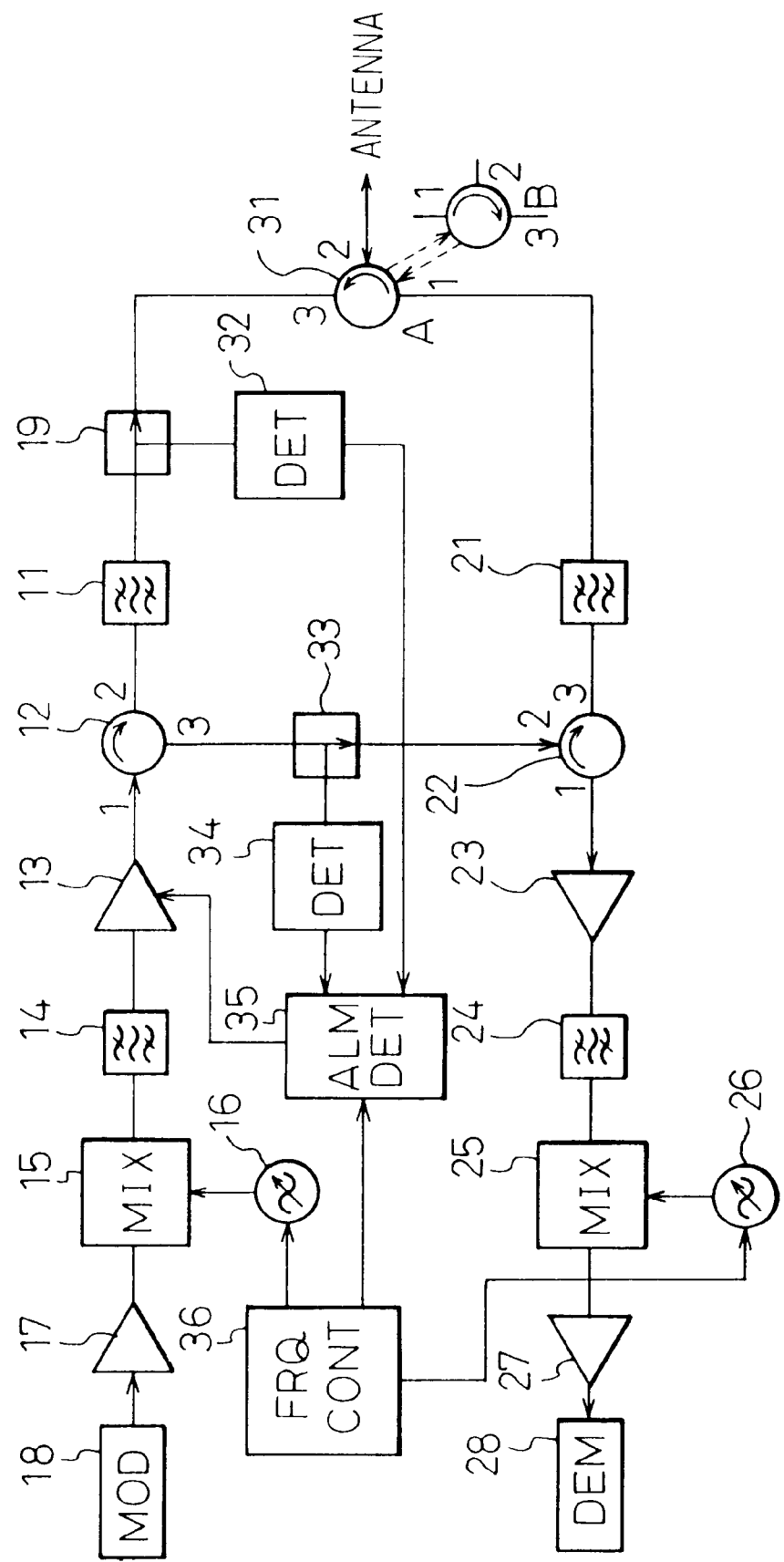
FIG. 6 is a block diagram showing a wideband transceiver according to an embodiment of the present invention.

FIG. 6 shows a wideband transceiver according to an embodiment of the present invention.

The transceiver has a low-band-pass filter 11 and a high-band-pass filter 21 to form a transmission path and a reception path.

The transmission path includes a modulator 18 to provide a modulated signal. The modulated signal is amplified by an intermediate-frequency amplifier 17 and is converted by a transmission mixer 15 into a signal having a given transmission channel frequency. At this time, a local transmission oscillator 16 provides the mixer 15 with the transmission channel frequency according to an instruction from a frequency controller 36. A band-pass filter 14 removes out-of-band components from the output signal of the mixer 15, and the filtered signal is amplified by a high-power amplifier 13.

The reception path receives a radio signal through the filter 11 or 21. A low-noise amplifier 23 amplifies the signal, and a band-pass filter 24 removes out-of-band components from the amplified signal. A reception mixer 25 converts the output signal of the filter 24 into a signal having an intermediate frequency of reception channel. At this time, a local reception oscillator 26 provides the mixer 25 with the intermediate frequency of reception channel according to an instruction from the frequency controller 36. The output of the mixer 25 is amplified by an intermediate-frequency amplifier 27, and the amplified signal is demodulated by a demodulator 28.

Switching operations of the low- and high-band-pass filters 11 and 21 will be explained. This embodiment employs circulators 12 and 22 instead of the mechanical switches of the prior art, as well as the characteristic of a band-pass filter to totally reflect an out-of-band signal, to minimize the size and weight of the transceiver and reduce the cost thereof.

Figure 7:
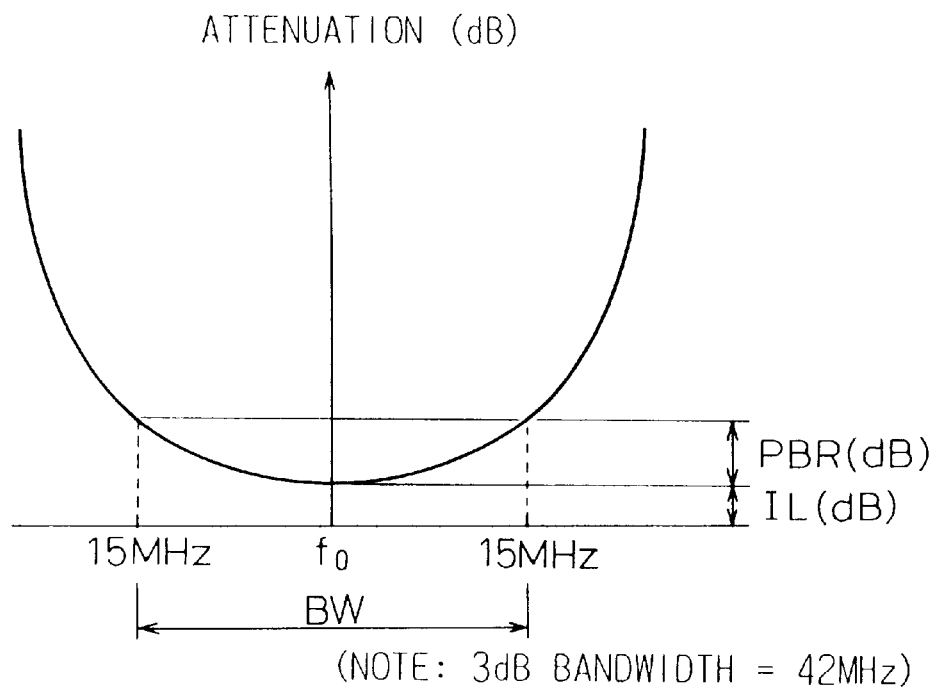
FIG. 7 shows the passband characteristics of a band-pass filter.
Figure 8:
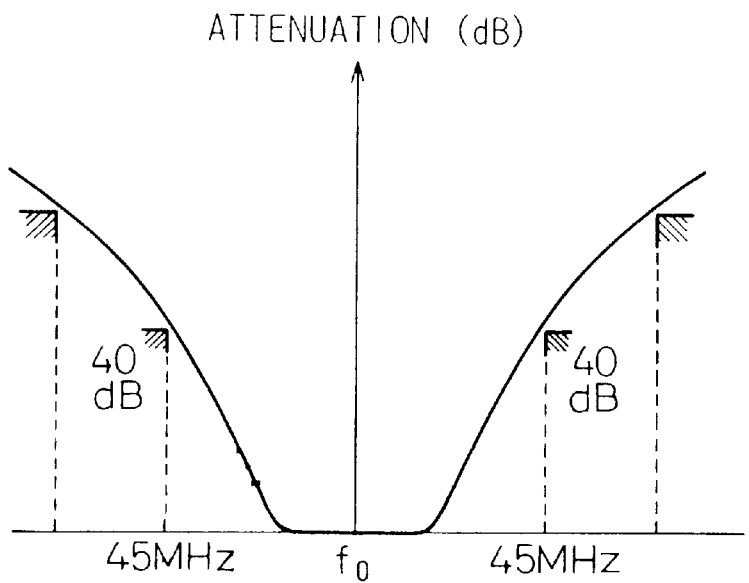
FIG. 8 shows the out-of-band attenuation characteristics of a band-pass filter.

FIG. 7 shows the passband characteristics of a 2-GHz band-pass filter, and FIG. 8 shows the out-of-band attenuation characteristics of the same. This filter may be used as any one of the filters 11 and 21.

In FIG. 7, a passband width BW is 30 MHz ranging from −15 MHz to +15 MHz around a center frequency f0. In FIG. 8, out-of-band attenuation is 40 dB at a point of −45 MHz or +45 MHz from the center frequency f0. The insertion loss of a filter is opposite to the reflection loss thereof, and therefore, an out-of-band input signal to which the filter provides an insertion loss of 40 dB is totally reflected by the filter.

The case of the frequency controller 36 of FIG. 6 setting a low band for transmission and a high band for reception and a circulator 31 being oriented in a direction A will be explained. A transmission signal is amplified by the high-power amplifier 13 and is passed through the circulator 12, the low-band-pass filter 11, a directional coupler 19, and the circulator 31. The circulator 31 passes the signal to the high-band-pass filter 21, which totally reflects the signal because the signal is out of the passband of the filter 21. The reflected signal returns to the circulator 31, which transfers the signal to an antenna (not shown).

A signal in the high band received by the antenna is passed through the circulator 31 and directional coupler 19 to the low-band-pass filter 11, which totally reflects the signal because the signal is out of the passband of the filter 11. The reflected signal passes through the circulator 31, high-band-pass filter 21, circulator 22, and low-noise amplifier 23.

A case of the frequency controller 36 setting the high band for transmission and the low band for reception and the circulator 31 being oriented in the direction A will be explained. A transmission signal is amplified by the high-power amplifier 13 and is passed through the circulator 12 to the low-band-pass filter 11, which totally reflects the signal because the signal is out of the passband of the filter 11. The signal is returned to the circulator 12 and is passed through a directional coupler 33 and the circulator 22 to the high-band-pass filter 21. The filter 21 passes the signal to the circulator 31, which transfers the signal to the antenna.

A signal in the low band received by the antenna is passed through the circulator 31 and directional coupler 19 to the low-band-pass filter 11. The filter 11 passes the signal to the circulator 12, directional coupler 33, and circulator 22 to the high-band-pass filter 21, which totally reflects the signal because the signal is out of the passband of the filter 21. Accordingly, the signal passes through the circulator 22 and enters the low-noise amplifier 23.

In this way, the embodiment is capable of freely setting transmission and reception frequencies by only changing the frequencies of the local oscillators 16 and 26 through the frequency controller 36 without the mechanical switches of the prior art. The circulator 31 may be oriented in a direction B of FIG. 6, to provide the same function. However, the direction A is preferable to the direction B because the direction B involves a larger difference between a transmission path and a reception path, i.e., between the number of transmission-related devices and the number of reception-related devices, than the direction A. This means that the direction B changes the output level and frequency of a signal more than the direction A when transmission and reception bands are switched from one to another.

This will be explained more precisely. If the circulator 31 is set in the direction B and if the low band is set for transmission, a transmission signal is passed through the high-power amplifier 13, circulator 12, low-band-pass filter 11, directional coupler 19, and circulator 31 to the antenna. If the high band is set for transmission, a transmission signal is passed through the high-power amplifier 13 and circulator 12 to the low-band-pass filter 11. The filter 11 totally reflects the signal, which is passed through the circulator 12, directional coupler 33, circulator 22, high-band-pass filter 21, output circulator 31, and directional coupler 19 to the low-band-pass filter 11. The filter 11 again totally reflects the signal, which is passed through the directional coupler 19 and output circulator 31, which transfers the signal to the antenna.

Figure 9:
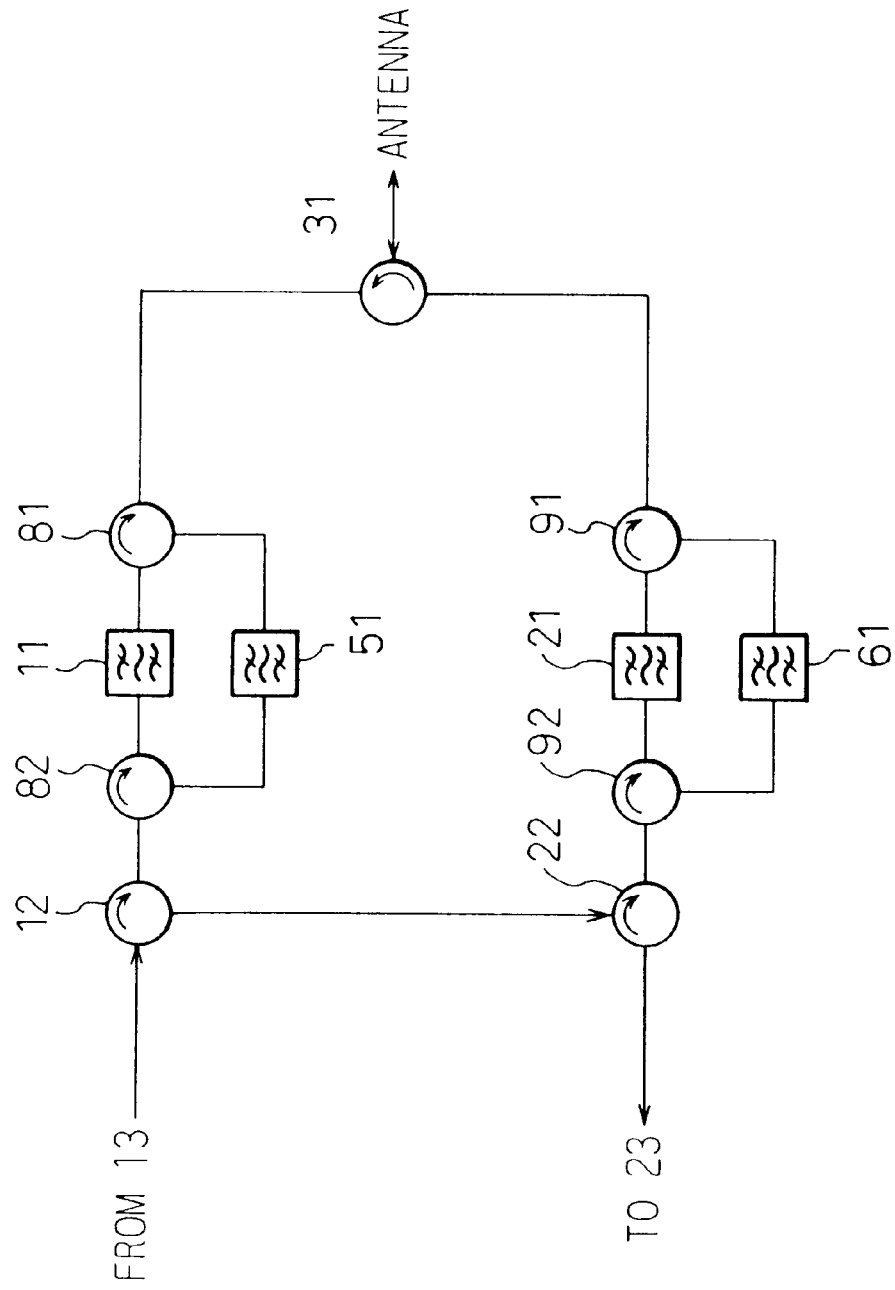
FIG. 9 is a block diagram showing circulators and band-pass filters of a wideband transceiver according to another embodiment of the present invention.

FIG. 9 shows an arrangement of circulators and band-pass filters according to another embodiment of the present invention. This embodiment corresponds to the prior art of FIG. 5.

Figure 10:
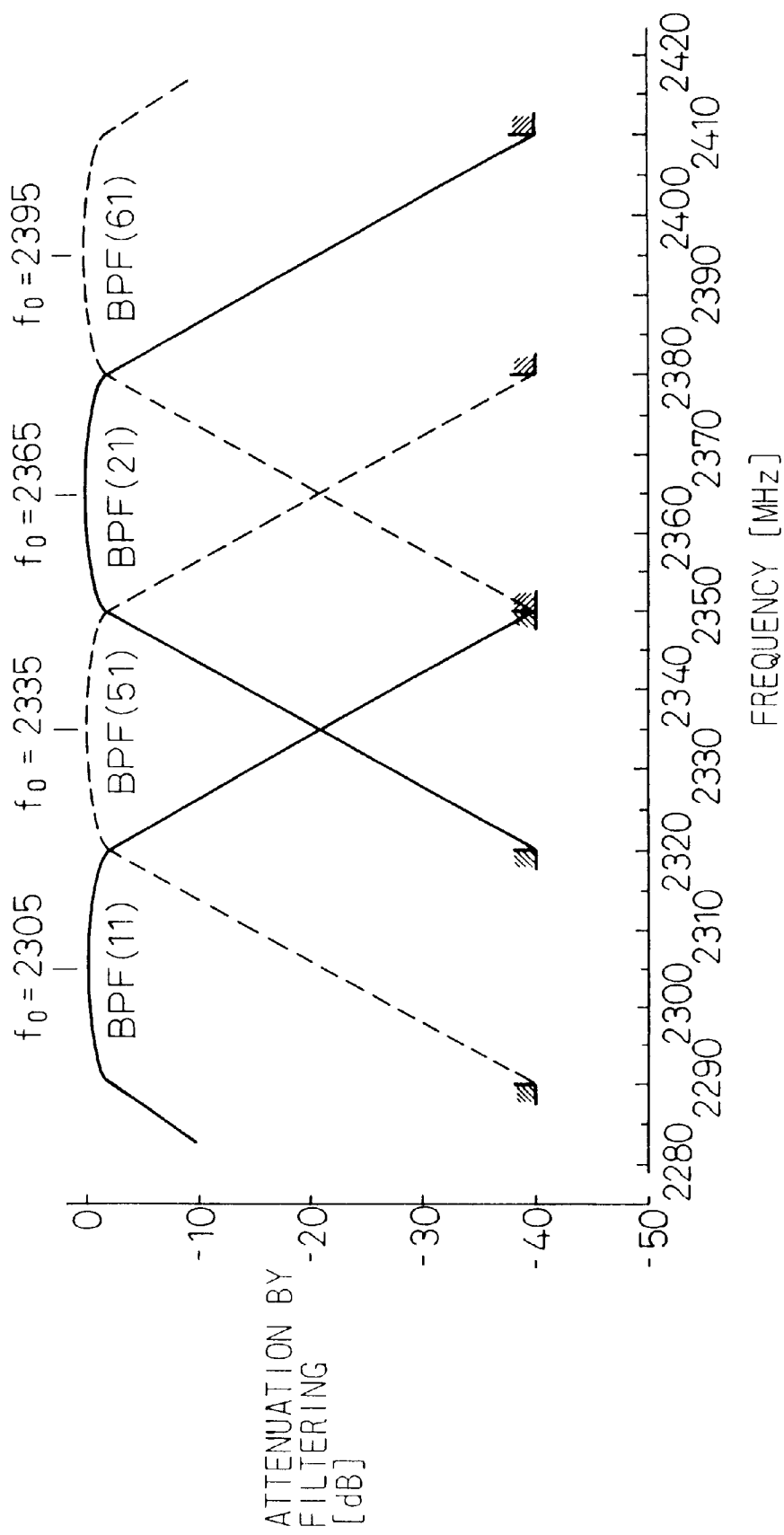
FIG. 10 shows the characteristics of a combination of the high- and low-band-pass filters of the embodiment of FIG. 9.

FIG. 10 shows examples of frequency characteristics achieved by the low- and high-band-pass filters of the embodiment of FIG. 9. In FIG. 10, the low- and high-band-pass filters 11 and 21 indicated with continuous lines form a pair, and the low- and high-band-pass filters 51 and 61 indicated with dotted lines form another pair.

FIG. 11 shows signal paths realized by various combinations of the band-pass filters of the embodiment of FIG. 9.

Returning to FIG. 9, the low-band-pass filters 11 and 51 are provided with circulators 81 and 82 that select one of the filters 11 and 51. The high-band-pass filters 21 and 61 are provided with circulators 91 and 92 that select one of the filters 21 and 61. A frequency controller 36 sets a transmission frequency and a reception frequency of a communication channel, and the filters and circulators operate as shown in FIG. 11.

Detecting an out-of-band abnormal signal according to the present invention will be explained with reference to FIGS. 6 and 12.

The directional coupler 19, a detector 32, the directional coupler 33, and a detector 34 are used to detect an out-of-band abnormal signal. When the frequency controller 36 sets the low band for transmission, it selects the detector 34 to detect an abnormal signal. When the frequency controller 36 sets the high band for transmission, it selects the detector 32 to detect an abnormal signal.

If a signal in the high band is transmitted or if an out-of-band oscillation occurs when the low band is set for transmission, the low-band-pass filter 11 reflects the abnormal signal. The reflected signal is passed through the directional coupler 33 and is detected by the detector 34. If a signal in the low band is transmitted when the high band is set for transmission, the abnormal signal is passed through the low-band-pass filter 11 and directional coupler 19 and is detected by the detector 32.

Figure 13:
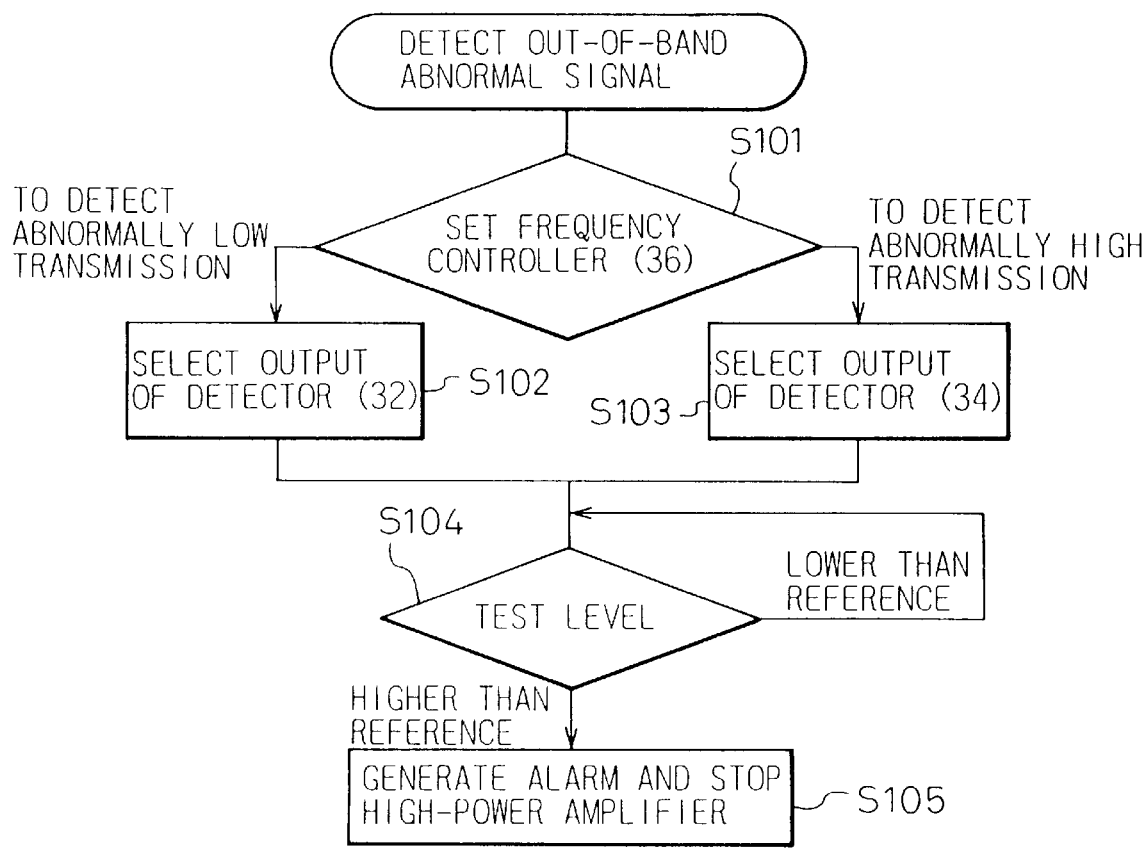
FIG. 13 is a flowchart showing the operation of an alarm unit according to the present invention.

FIG. 13 is a flowchart showing the operation of an alarm unit 35 of FIG. 6.

In step S101, the frequency controller 36 sets a frequency. In steps S102 and S103, the alarm unit 35 selects one of the detectors 32 and 34 according to the set frequency. In step S104, the alarm unit 35 determines whether or not the output of the selected detector is above a threshold. If the output is above the threshold, the alarm unit 35 determines that it is an abnormal signal, generates an alarm, and stops the high-power amplifier 13 in step S105 to protect the internal circuits of the transceiver.

Stopping the high-power amplifier 13 will be explained. The detectors 32 and 34 detect a transmission signal and a reception signal. There is a level difference between the transmission and reception signals. For example, the level of the transmission signal is higher than that of the reception signal. A reference level is set between the transmission and reception signals, and if a detected level is above the reference level, it is determined that there is an abnormal signal to be transmitted, and the high-power amplifier 13 is stopped.

The present invention is capable of detecting and monitoring not only an out-of-band abnormal signal but also a normal transmission/reception signal according to the outputs of the detectors 32 and 34.

As explained above, the present invention provides a simple wideband transceiver employing circulators instead of conventional mechanical switches. This transceiver realizes transmission and reception functions only by setting transmission and reception frequencies, so that the transceiver is compact, light, and low-cost.

The wideband transceiver of the present invention is capable of detecting abnormal transmission and reception signals.

I claim:

1. A wideband transceiver comprising:

an antenna;

a transceiver section for transmitting a transmission frequency signal to a transmission channel and receiving a reception frequency signal from a reception channel;

high- and low-band-pass filters for dividing a communication band into high and low bands to form the transmission and reception channels;

circulators arranged between the transceiver section and the high- and low-band-pass filters and between the high- and low-band-pass filters and the antenna, for switching over transmission and reception paths by combining signal propagating directions of the circulators and out-of-band signal reflecting directions of the high- and low band-pass filters, according to each specified frequency of the transmission and reception frequency signals; and a frequency controller for switching over the high and low bands assignment of the transmission and reception frequency signals by setting local oscillation frequencies provided to the transceiver section to change over the specified frequencies of the transmission and reception frequency signals.

2. A wideband transceiver comprising:

high- and low-band-pass filters for dividing a communication band into high and low bands to form transmission and reception channels;

circulators, wherein transmission and reception paths are switched over by combining signal propagating directions of the circulators and out-of-band signal reflecting directions of the high- and low band-pass filters according to specified transmission and reception frequencies, wherein the circulators include:

a first circulator having a first terminal for receiving a transmission signal, a second terminal connected to a first terminal of the low-band-pass filter, and a third terminal;

a second circulator having a first terminal for providing a reception signal, a second terminal connected to the third terminal of the first circulator, and a third terminal connected to a first terminal of the high-band-pass filter; and a third circulator having a first terminal connected to a second terminal of the high-band-pass filter, a second terminal connected to input/output means for transmitting and receiving transmission and reception signals, and a third terminal connected to a second terminal of the low-band-pass filter, the circulating direction of each of the circulators being from the first terminal to the second terminal, from the second terminal to the third terminal, and from the third terminal to the first terminal.

3. The wideband transceiver as claimed in claim 2, further comprising:

a first directional coupler disposed between the second terminal of the low-band-pass filter and the third circulator and oriented toward the third circulator;

a first detector for detecting the level of an output signal from the first directional coupler;

a second directional coupler disposed between the first circulator and the second circulator and oriented toward the second circulator;

a second detector for detecting the level of an output signal from the second directional coupler; and alarm means for finding an abnormality, if any, in signals passing through the first and second directional couplers according to the outputs of the first and second detectors.

4. The wideband transceiver as claimed in claim 3, wherein the alarm means selects one of the outputs of the first and second detectors according to specified transmission and reception frequencies and finds an abnormality in the selected output.

5. The wideband transceiver as claimed in claim 2, wherein the third circulator is replaced with a fourth circulator having a first terminal connected to the second terminal of the low-band-pass filter, a second terminal connected to the input/output means, and a third terminal connected to the second terminal of the high-band-pass filter.

6. The wideband transceiver as claimed in claim 5, further comprising:

a first directional coupler disposed between the second terminal of the low-band-pass filter and the fourth circulator and oriented toward the fourth circulator;

a first detector for detecting the level of an output signal from the first directional coupler;

a second directional coupler disposed between the first circulator and the second circulator and oriented toward the second circulator;

a second detector for detecting the level of an output signal from the second directional coupler; and alarm means for finding an abnormality, if any, in signals passing through the first and second directional couplers according to the outputs of the first and second detectors.

7. The wideband transceiver as claimed in claim 6, wherein the alarm means selects one of the outputs of the first and second detectors according to specified transmission and reception frequencies and finds an abnormality in the selected output.

8. The wideband transceiver as claimed in claim 2, wherein:

the high-band-pass filter consists of n high-band-pass filters;

the low-band-pass filter consists of n low-band-pass filters;

a fourth circulator having n+1 terminals and the same circulating direction as the first circulator is arranged between and connected to the first circulator and the n low-band-pass filters;

a fifth circulator having n+1 terminals and the same circulating direction as the first circulator is arranged between and connected to the n low-band-pass filters and the third circulator;

a sixth circulator having n+1 terminals and the same circulating direction as the second circulator is arranged between and connected to the second circulator and the n high-band-pass filters; and a seventh circulator having n+1 terminals and the same circulating direction as the second circulator is arranged between and connected to the n high-band-pass filters and the third circulator.

9. The wideband transceiver as claimed in claim 8, further comprising:

a first directional coupler disposed between the fifth circulator and the third circulator and oriented toward the third circulator;

a first detector for detecting the level of an output signal from the first directional coupler;

a second directional coupler disposed between the first circulator and the second circulator and oriented toward the second circulator;

a second detector for detecting the level of an output signal from the second directional coupler; and alarm means for finding an abnormality, if any, in signals passing through the first and second directional couplers according to the outputs of the first and second detectors.

10. The wideband transceiver as claimed in claim 9, wherein the alarm means selects one of the outputs of the first and second detectors according to specified transmission and reception frequencies and finds an abnormality in the selected output.

11. A wideband transceiver comprising:

transmitting and receiving filters for dividing a communication band into high and low bands to form transmission and reception channels;

means for guiding a transmitting signal reflected by the receiving filter to an output circuit;

means for guiding a received signal reflected by the transmitting filter to a reception circuit; and a frequency controller for switching over the high and low bands assignment of the transmission and reception frequency signals by setting local oscillation frequencies provided to the transceiver section to change over the specified frequencies of the transmission and reception frequency signals.

12. A wideband transceiver having filters for dividing a communication band into high and low bands to form transmission and reception channels: comprising;

means for extracting transmitting and received signals reflected by the filters;

means for guiding the reflected transmitting signal to an output circuit;

means for guiding the reflected received signal to a reception circuit; and a frequency controller for switching over the high and low bands assignment of the transmission and reception frequency signals by setting local oscillation frequencies provided to the transceiver section to change over the specified frequencies of the transmission and reception frequency signals.

* * * * *